July 29, 1952
S. W. HAYES
2,604,748
MOWER
Filed Nov. 26, 1947
3 Sheets-Sheet 1
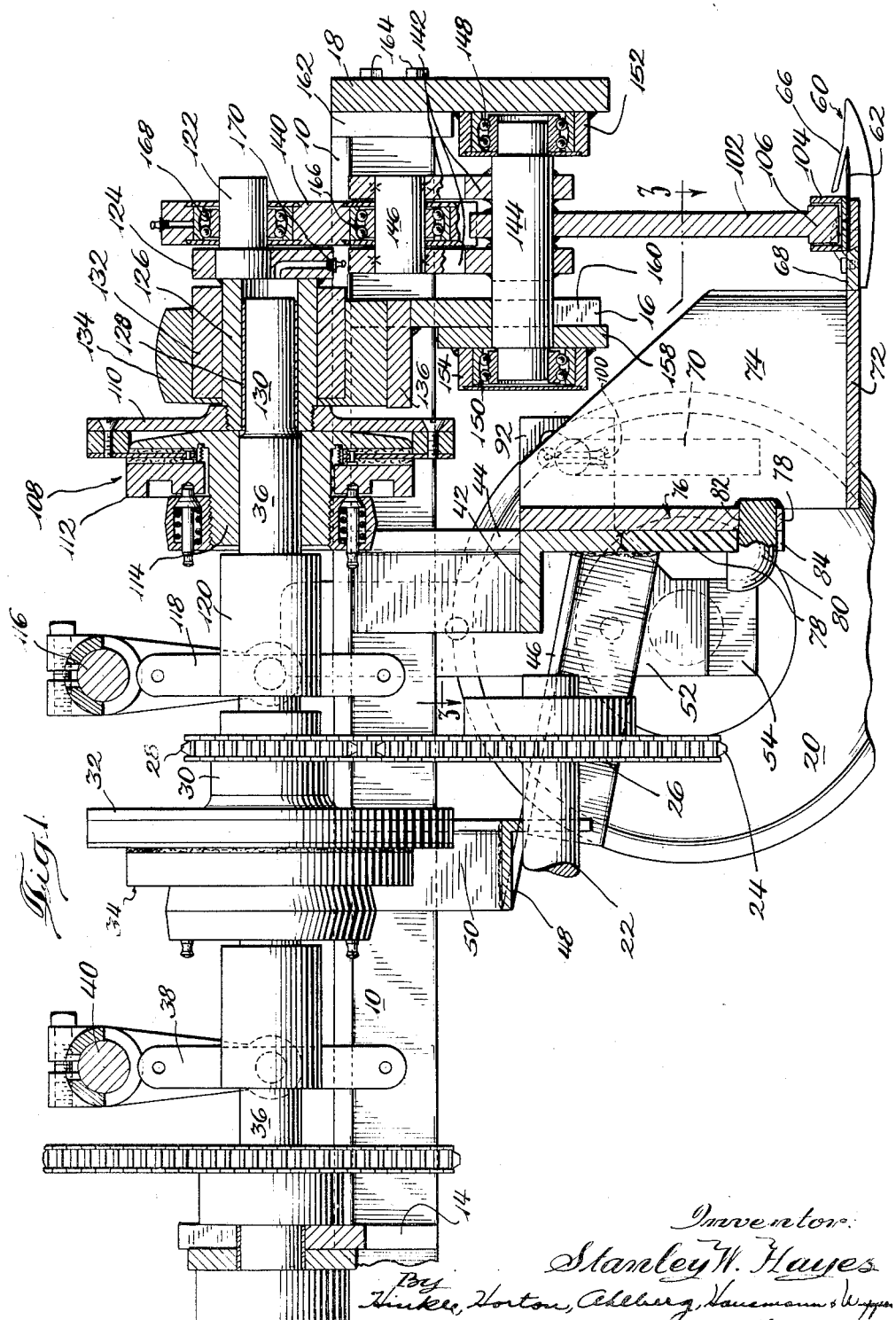

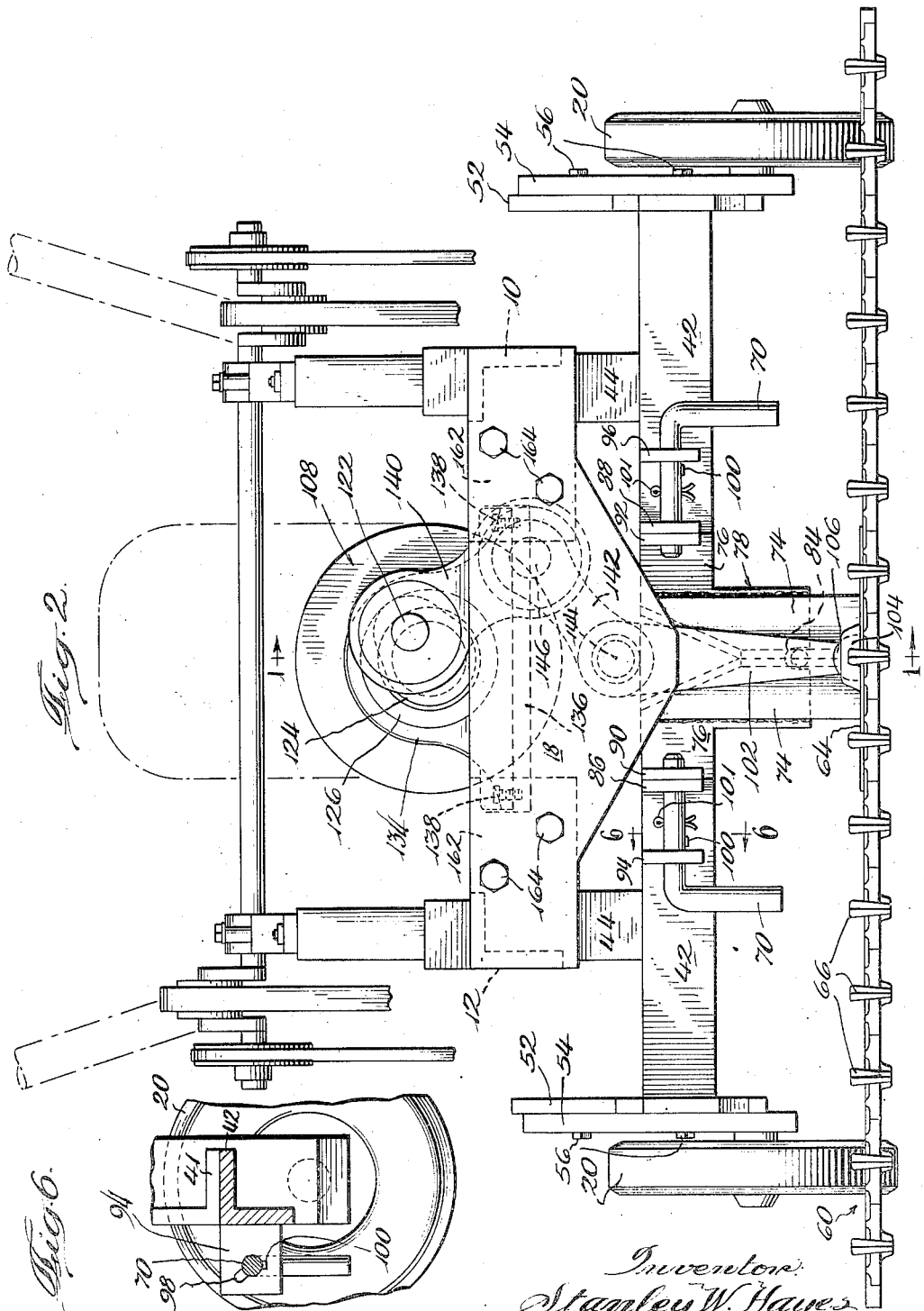

July 29, 1952 S. W. HAYES 2,604,748
MOWER
Filed Nov. 26, 1947 3 Sheets-Sheet 3
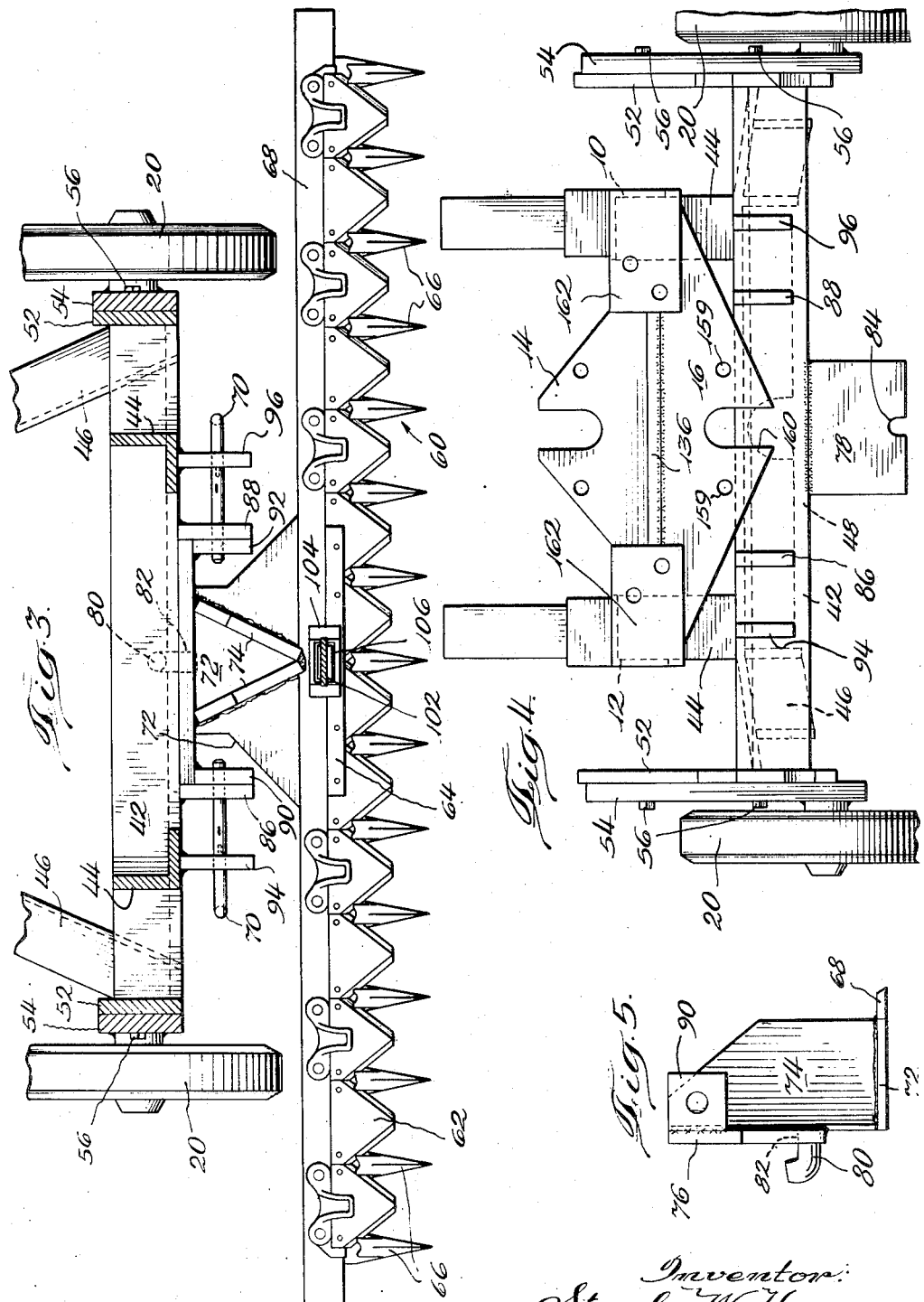
Inventor:
Stanley W. Hayes
Attorneys Patented July 29, 1952

2,604,748

UNITED STATES PATENT OFFICE 2,604,748

MOWER

Stanley W. Hayes, Richmond, Ind., assignor to Hayes Track Appliance Company, Richmond, Ind., a corporation of Indiana Application November 26, 1947, Serial No. 788,155

13 Claims. (Cl. 56—26.5)

The present invention relates to mowers and more particularly to power operated mowers capable of both light and heavy duty operation, such as encountered in the mowing of large lawns, parks, orchards, and the like.

One of the objects of the present invention is to provide a new and improved mower characterized in simplicity and ruggedness of construction and a construction which will enable the mower to be operated for long periods of time without excessive heating or requiring an excessive amount of lubrication.

A further object of the present invention is to provide a new and improved mower characterized by a cutter assembly which can be readily attached to the mower and detached therefrom in the event repairs are necessary to the cutting elements.

A further object of the present invention is to provide a new and improved mower comprising a readily detachable cutter assembly and a drive cooperatively associated therewith and in which the drive itself is of an improved and efficient nature.

Other objects and advantages of the present invention will become apparent from the ensuing description of an embodiment thereof, in the course of which reference is had to the accompanying drawings, in which:

Fig. 1 is a fragmentary axial cross sectional view (along line 1—1 of Fig. 2) through the front end of a mower embodying the present invention;

Fig. 2 is a fragmentary front elevational view of the mower. Certain parts of the mower, such as the transmission, prime mover, and controls are omitted from this figure but they may be of the general character disclosed in my Patent No. 2,328,803, granted September 7, 1943.

Fig. 3 is a reduced horizontal cross sectional view taken along the broken line 3—3 of Fig. 1;

Fig. 4 is a front elevational view of the mower frame with a pillow block omitted to better disclose other features of construction;

Fig. 5 is a side elevational view of the cutter bar assembly with the sickle cutters and associated guards removed therefrom; and Fig. 6 is a fragmentary cross sectional view taken along the line 6—6 of Fig. 2 illustrating details of the means for attaching the cutter assembly to the mower.

Before proceeding with the detailed description of the present invention, it may be stated that the present invention relates to certain structural and operating features of the drive for the cutting mechanism of a mower, such as a sickle type power-driven mower, which mower may be of the type illustrated and described in my earlier United States Patent No. 2,328,803. For this reason the mower has not been illustrated completely, although so much of it is shown as is required for an adequate understanding of the present invention.

The mower includes a pair of main longitudinally extending side frame members 10 and 12 (see Fig. 2) interconnected by suitable crosspieces, of which only a limited number are shown. Among the crosspieces are a rear main supporting crosspiece 14, a front main shaft supporting crosspiece 16, and a front plate 18 (see particularly Fig. 1).

The frame is supported upon four wheels, of which but the two front wheels 20 are shown. The rear wheels, not shown, are driven through a rearwardly extending drive shaft 22 near the front end of which is secured a sprocket wheel 24 driven by a chain 26 extending therefrom to a sprocket wheel 28 having its hub 30 secured to a clutch plate 32 forming part of a clutch 34 adapted selectively to be engaged to connect the sprocket wheel to a main drive shaft 36 extending centrally between the side frames and supported by previously referred to crosspieces 14 and 16. This clutch is adapted to be engaged by a yoke 38 operatively connected to a rock shaft 40 operable in suitable manner.

The front wheels are supported from the side plates upon a crosspiece 42 of angle iron. This crosspiece is supported below and from the side frames by short angle iron supports 44, see Figs. 1, 2 and 4. The crosspiece 42 is also braced by the short angularly and rearwardly extending braces 46, the rear ends of which are secured to a crosspiece 48 suspended below the side frames by the short supports 50, see Fig. 1.

The wheels are adjustably mounted relative to the side frame. The mounting includes vertically disposed supports 52 secured at the ends of the crosspiece 42. The wheels are suspended from vertical hangers 54 which are secured by suitable means, such as the bolts 56, in desired vertical relation to the supports 52.

The present invention pertains particularly to the driving and supporting means for the cutting mechanism. The cutting mechanism may take various forms but is disclosed as being a reciprocable sickle type cutter, indicated as a whole by the reference character 60. It includes the reciprocably mounted cutter knives 62 secured to a reciprocating support 64 and the guards 66, which are adapted to be secured to a cutter bar 68 which, in accordance with one of the features of the present invention is detachably secured to the mower and particularly to the crosspiece 42.

The advantage of the detachable cutter bar assembly is that it enables the various parts of the cutter mechanism readily to be repaired whenever necessary. The knives and guards, which are also attached to the cutter bar, need to be sharpened or renewed when damaged. This makes it necessary to take the cutter bar assembly off quite frequently and with the arrangement of the present invention this can be done easily. All that is required is the unlocking of the cutter bar assembly by removal of a couple of connecting pins 70, see Fig. 2, after which the front end of the machine can be lifted up in suitable manner with the result that the cutter bar assembly drops out. The lifting of the front end of the machine can be accomplished very easily by depressing the guiding handles, not shown, which extend rearwardly from the mower.

The cutter bar assembly includes the cutting mechanism 60, the cutter bar 68 and the means for supporting the latter from the crosspiece 42. The supporting means includes a generally trapezoidal plate 72 secured to the back side of the cutter bar (see Figs. 1 and 3) and which is secured to what may be considered a vertical post structure comprising a pair of diverging plates 74, the front edges of which are welded together, and a flat back plate 76 welded to the rear edges of plates 74 and adapted to abut against the front flange of the crosspiece 42, and a plate 78 secured and extending downwardly below the frame from the front flange of the crosspiece.

The cutter assembly is readily and properly positioned relative to the crosspiece 42 by means including a hook 80 passing through an opening 82 near the lower end of plate 76 of the cutter assembly post and to which it is secured as by welding. The hook passes through a generally U-shaped slot 84 located in the plate 78, see particularly Fig. 4.

The cutter assembly is additionally positioned relative to the crosspiece 42 and also mounted on or secured to the latter by forwardly extending vertical abutment flanges or plates 86 and 88 immovably secured to the front flange of the crosspiece and similar flanges or plates 90 and 92 immovably secured to the cutter bar post back plate 76, so that when properly assembled, the two sets of flanges abut against each other.

The cutter bar assembly is detachably secured to the crosspiece by the connecting pins 70 which pass through aligned apertures in the adjacent pairs of plates 86, 88, 90 and 92. The pins also pass through apertured plates 94, 96 secured to the crosspiece 42 in spaced relation to the plates 86 and 88. The spacing is such that the horizontal portions of the pins keep the cutter bar assembly securely in place. To prevent undesired release of the cutter bar assembly, the plates 94 and 96 are provided with radial slots 98 and the pins with corresponding radially outwardly extending projections 100. The slots are so located that the pins can be inserted only when the vertical parts thereof are moved angularly upward. The pins likewise cannot be detached by axial movement with the vertical parts extending downwardly as shown in Figs. 2 and 6. Cotter pins 101 are also passed through the pins to prevent undesired removal thereof.

Another feature of the invention resides in the means for driving the cutting mechanism, which means is characterized by its simplicity, ruggedness and efficient operation and a further feature resides in the operative connection between the driving means and the cutter bar assembly enabling the latter readily to be detached from the mower whenever desired.

The operative connection between the reciprocable cutter knife carrying bar 64 and the driving mechanism includes a generally vertically arranged oscillatable driving rod or arm 102 located above the bar and the lower end of which is detachably connected to the bar 64. This detachable connection includes a socket 104 secured to the top side of the reciprocable cutter knife carrying bar 64 and an enlarged knob or ball 106 secured to the lower end of the arm 102 so that it constitutes an integral part thereof, and which for convenience is called a hammer and which fits movably within the socket 104.

The arm 102 is oscillated through a novel mechanism forming one of the important features of this invention. It is oscillated through power derived from the main shaft 36 and when a clutch, indicated by the reference character 108, is engaged. The clutch includes a clutch plate 110 operatively connected to the arm 102, in a manner to be described shortly, and a movable clutch engaging plate 112 mounted upon a hub 114 keyed to the shaft 36. The clutch is engaged through the operation of a rock shaft 116 operatively connected to a yoke 118 connected in turn to a sleeve 120 axially movable to engage and disengage the clutch through a toggle mechanism, not shown but which may be like that in my earlier issued patent.

The driving arm 102 is oscillated by a crank shaft 122 adapted to be driven through the clutch 108 when the latter is engaged. The crank shaft 122 is connected to the clutch through a crank arm 124 secured, as by welding, to a tube 126 secured at its inner end to the clutch plate 110 and provided with a central bronze bushing 128 wherein the reduced diameter end 130 of the main shaft 36 is rotatable. The tube is journaled for rotation in a roller bearing 132 in a pillow block 134 secured to the front crosspiece 16 or, more specifically, to a short horizontal plate 136 welded to the top thereof, as by a pair of cap screws 138, see Fig. 2.

The driving arm 102 is operatively connected to the crank shaft 122 through a connecting rod 140 and a pair of intermediate arms 142 interconnecting the main shaft 144 and a top shaft 146, see Fig. 1.

The upper end of the oscillatable arm or rod 102 is fixedly secured, as by welding, to the main shaft 144. The shaft is mounted for oscillation about a horizontal axis in self-aligning ball bearings 148 and 150. Bearing 148 is mounted in a bearing housing 152 secured to the inside of the front plate 18. Bearing 150 is mounted within a housing 154 secured as by welding to a plate 158 bolted to the rear of plate 16. The bolts are not shown but the bolt holes 159 are shown in Fig. 4. The assembly of the oscillatable drive to the plate 16 is facilitated by providing the crosspiece 16 with a generally U-shaped and inverted slot 160 at its lower end.

The front plate 18 is secured to the front ends of the side frames, or more particularly, to a pair of supporting plates 162 welded to the front ends of the side frame members 10 and 12. The plates and front plate are apertured for the reception of securing bolts 164.

The shaft 144 is oscillated through the two arms 142 which are welded thereto at opposite sides of the driving arm 102. The top shaft 146 is fixedly secured to the upper ends of the intermediate arms and it and the crank shaft 122 are connected to the connecting rod 140 through the self aligning ball bearings 166 and 168, respectively.

Among the advantages of the above described construction are that the parts are self-aligning, friction is reduced to a minimum, and the bearings may be lubricated readily through conventional pressure type fittings. Also, the bushing 128 in which the reduced end 130 of the main shaft is journaled can readily be lubricated through a conduit 170 leading thereto through the crank arm 124, as illustrated in Fig. 1.

It is believed that the operation and advantages of the structure as a whole of the present invention will be apparent from the foregoing, but they will be reviewed briefly. Both the cutter assembly and the cutter driving mechanism may be constructed and fabricated simply and economically. In large measure, the parts are of plate material so that they can be readily secured to each other as by welding.

The cutter assembly may be readily attached to and detached from the mower. After it has been attached, as it is indicated in Figs. 1 and 2, it can be readily detached and separated from the mower so that parts of the cutter which need repair or replacement can be made readily accessible for this purpose. To detach the cutter assembly, all that is necessary is that the cotter pins 101 be removed, the pins 70 be rotated so that the locking projections 100 thereon are in alignment with the slots 98. In this position, the pins can be moved outwardly to release the cutter assembly from the crosspiece 42. The cutter assembly can readily be separated from the mower and the mower moved away simply by tipping the mower around its rear wheels which can be done easily by depressing a handle attached to the mower. To reassemble the mower after the necessary repairs have been made, it is necessary only to bring the mower near the cutter bar assembly, lift it, and then maneuver it to the approximate position relative to the cutter assembly. The mower can then be lowered into place and the cutter assembly properly located and positioned. The positioning is readily effected by locking the hook 80 in the slot 84 in the depending plate 78 and locking the plates 90 and 92 adjacent to the plates 86 and 88 on the crosspiece. Thereafter, the assembly can be locked to the mower by reinsertion of the pins 70.

The cutter knives are reciprocated whenever the mower is operating and the clutch 108 engaged. When the clutch is engaged, the clutch plate 110 is driven to rotate crank shaft 122 through the intermediary of the tube 126 and crank arm 124. The crank shaft 122 oscillates the connecting rod 140 and the latter in turn oscillates the arm 102 and its shaft 144 through the arms 142. The mechanism is self-aligning and the use of the ball bearings minimizes the friction to such an extent that frequent lubrication is unnecessary.

The operative connection between the drive and the cutter includes the socket 104 and the interfitting ball 106 at the lower end of the arm 102. This driving connection is readily detachable and facilitates assembly and disassembly of the cutter mechanism.

While but a single embodiment of the invention has been described in detail, it should be understood that the details thereof are not intended to be limitative of the invention except in so far as set forth in the accompanying claims.

Having this described my invention, what I claim as new and desire to secure by Letters Patent of the United States is:

1. In a mower, a frame having a part extending transversely of the mower, a generally vertically arranged forwardly facing plate secured to and depending from said transversely extending frame part, a cutting mechanism assembly including a post structure and a cutter bar supported thereby, said post structure including at its lower end a forwardly extending base plate secured directly to said cutter bar and a vertical post having a vertically extending backplate, said post being secured to said base plate, and means for detachably securing said post structure to said frame with said backplate in abutting relationship with said transversely extending frame part and said forwardly facing depending plate.

2. In a mower, a frame having a part extending transversely of the mower, a generally vertically arranged forwardly facing plate secured to and depending from said transversely extending frame part at the center thereof, a cutting mechanism assembly including a post structure and a cutter bar supported thereby, said post structure including at its lower end a forwardly extending base plate secured directly to said cutter bar at the center thereof and a vertical post having a vertically extending backplate and secured to said base plate, and cooperating means carried by said transversely extending frame part and by said backplate for detachably securing said assembly to said frame with said backplate in abutting relationship with said transversely extending frame part and said forwardly facing depending plate.

3. A mower as claimed in claim 2 wherein said cooperating securing means comprises spaced apart longitudinally and forwardly extending positioning and mounting members on said transversely extending frame part, spaced apart longitudinally extending vertical positioning and mounting members on said backplate adapted to abut against said positioning and mounting members on said frame part, and means associated with both said positioning and mounting members for securing said cutting mechanism assembly to said frame to be supported thereby.

4. In a mower, a frame, a plate secured to and depending from said frame in vertical position, a cutting mechanism including reciprocable cutting means, a cutter bar supporting the cutting means and a post structure supporting the cutter bar, said post structure including at its lower end a forwardly extending base plate secured directly to the cutter bar and a vertical post having a vertically disposed backplate and secured to said base plate, and means operatively connecting said post structure to said first named plate and said frame in abutting relationship.

5. A mower as claimed in claim 4, wherein said first named plate has a locating and positioning slot in its lower edge, and including a hook on said post structure adapted to fit into said slot to locate said cutting mechanism relative to said frame.

6. In a mower, a frame having a transverse part and spaced apart longitudinally and forwardly extending positioning and mounting members on the transverse part, a cutting mechanism assembly including spaced apart longitudinally extending positioning and mounting members thereon adapted to abut against the positioning and mounting members on said frame part, additional longitudinally and forwardly extending members on said frame part each spaced from an associated one of said first mentioned positioning and mounting members and the member abutting thereagainst, all of said members having aligned apertures, and a pair of pins each adapted to extend through the apertures in one of each of said members.

7. In a mower as claimed in claim 6, wherein said pins have radial projections and said additional members have radial slots through which said pins may be passed.

8. In a mower, a frame having spaced apart longitudinally and forwardly extending positioning and mounting members and a dependent vertically disposed plate with a guiding slot at its lower end, a cutting mechanism assembly comprising spaced apart longitudinally extending positioning and mounting members thereon adapted to abut against the positioning and mounting members on said frame and a hook adapted to be received in said slot, and means associated with both said positioning and mounting members for securing said assembly to said support.

9. In a mower, a frame, reciprocable cutting means supported on said frame, and a drive operatively connected to said cutting means, said drive comprising a single dependent arm with a ball-like hammer at its lower end, a shaft secured to and supporting said arm, a pair of transverse spaced apart supports secured to said frame for movably supporting said shaft, a pair of arms secured to said shaft at opposite sides of said dependent arm, a top shaft secured to and extending between said pair of arms, a tubular driving member, a crank arm secured to said tubular driving member, and a connecting rod movably connected to said crank arm and top shaft.

10. In a mower, spaced transverse supporting structures at the forward end of said mower, reciprocable cutting means, means detachably supporting said cutting means from one of said supporting structures, means including an oscillatable arm supported from another of said supporting structures, and a detachable connection connecting said cutting means and said oscillatable arm so that said oscillatable arm may reciprocate said cutting means, said detachable connection including a socket on the reciprocable element of said cutting means and a portion of said arm movably fitting into said socket.

11. In a mower, a frame, reciprocable cutting means supported on said frame, and a drive operatively connected to reciprocate said cutting means, said drive comprising an oscillatable dependent arm with an operative connection to said cutting means at its lower end, a substantially horizontal longitudinally extending shaft secured to said frame and supporting said arm, at least one intermediate arm secured to said shaft, a top shaft secured to said intermediate arm, a rotatable substantially horizontal longitudinally extending driving member, a crank arm secured to said driving member, and a connecting rod movably connected to said crank arm and said top shaft.

12. A mower as claimed in claim 11 including a rotatable driving shaft, and wherein said driving member comprises a tubular member journaled on one end of said driving shaft and connected to be driven therefrom.

13. A mower as claimed in claim 11, wherein said frame includes a plurality of transversely extending generally parallel supports, means journalling said first named shaft in a pair of said supports, and means detachably mounting said cutting means on another of said supports.

STANLEY W. HAYES.

REFERENCES CITED

The following references are of record in the file of this patent:

UNITED STATES PATENTS

| Number | Name | Date |
|---|---|---|
| 1,567,055 | Huff | Dec. 29, 1925 |
| 1,823,267 | Gilardi | Sept. 15, 1931 |
| 2,328,803 | Hayes | Sept. 7, 1943 |
| 2,368,290 | Donald | Jan. 30, 1945 |
| 2,397,310 | Donald | Mar. 26, 1946 |